United States Patent [19]

Rosa

[11] Patent Number: 4,460,861
[45] Date of Patent: Jul. 17, 1984

[54] CONTROL SYSTEM FOR MACHINE COMMUTATED INVERTER-SYNCHRONOUS MOTOR DRIVES

[75] Inventor: John Rosa, Pittsburgh, Pa.

[73] Assignee: Westinghouse Electric Corp., Pittsburgh, Pa.

[21] Appl. No.: 544,149

[22] Filed: Jan. 21, 1983

[51] Int. Cl.³ .............................................. H02P 5/36
[52] U.S. Cl. ................................... 318/722; 318/803; 318/717
[58] Field of Search ............................... 318/798–811, 318/700, 716, 717, 719, 722, 723

[56] References Cited

U.S. PATENT DOCUMENTS

| | | | |
|---|---|---|---|
| 3,840,799 | 10/1974 | Macko et al. | 318/723 |
| 4,215,304 | 7/1980 | D'Atre et al. | 318/803 |
| 4,255,695 | 3/1981 | Plunkett et al. | 318/723 |
| 4,271,385 | 6/1981 | Azusawa | 318/722 |
| 4,276,505 | 6/1981 | Bose | 318/804 |
| 4,309,643 | 1/1982 | Akamatsa | 318/714 |
| 4,328,454 | 5/1982 | Okuyama et al. | 318/803 |
| 4,364,004 | 12/1982 | Bourbean | 318/802 |

OTHER PUBLICATIONS

IEEE Transactions on Industry Applications, Mar.-/Apr. 1979, vol. 1A-15, No. 2, by John Kosa, pp. 155-164.

Primary Examiner—G. Z. Rubinson
Assistant Examiner—A. Evans
Attorney, Agent, or Firm—C. M. Lorin

[57] ABSTRACT

An adjustable speed machine-commutated inverter-synchronous motor drive includes control of the inverter at a selected rate without positioning. The line converter is controlled so as to maintain a relation $I = f(T)$ and the relation $E/I = g(T)$ is established by applying to the field regulator loop a reference which is a function of T, where T is the torque, I the current drawn by the motor drive and E the excitation voltage. Accordingly, the torque is not sensed. The functions are chosen so that the commutation margin angle is safe under natural commutation by the EMF of the motor and also chosen to improve drive operation.

13 Claims, 14 Drawing Figures

CONTROL SYSTEM FOR MACHINE COMMUTATED INVERTER-SYNCHRONOUS MOTOR DRIVES

BACKGROUND OF THE INVENTION

The invention relates to adjustable frequency machine-commutated inverted-synchronous AC motor drives. In this type of drive system a line converter is combined with a DC link comprising inductor to provide an adjustable DC current source impressing a DC output current onto the machine converter operating as an inverter. Both converters operate with natural commutation, the machine converter being commutated by the EMF of the synchronous motor.

A motor drive of such configuration has been controlled conventionally in the past by delivering firing pulses to the machine converter at an average rate matching the speed of the motor, and having proper firing angle $\beta$. One problem with pulse firing under natural commutation is to insure a safe commutation margin angle $\delta$. Prior art implementation has used control circuits which "position" the firing pulses at some electrical angle $\beta$ which anticipates the commutation overlap angle u so as to keep the commutation margin angle $\delta = \beta - u$ at or above a safe limit. This "angular positioning", which requires a minor control loop, is done with reference to the rotor position sensed by a position transducer, or effected with reference to a fictitious "voltage behind the subtransient reactance" which is synthesized by the control circuitry using signals proportional to the motor terminal voltages and to the DC link, or motor, line currents.

In addition to "positioning" the inverter firing pulses, the prior art control circuits include minor control loops which (a) control the $I_{dc}$ link current via gate control of the line converter, and (b) control motor field current $I_f$ via a controllable exciter.

These minor control loops are usually responsive to a major regulator loop which controls motor speed. While there are many variations, these state-of-art schemes have the common feature that they concurrently control the $I_{dc}$ link current, the $I_f$ motor field current and $\beta$, the angular position of the inverter firing angle.

Another approach is found in U.S. Pat. No. 3,840,799 of J. E. Macko et al where the firing pulses are generated at a motor speed matching rate but without any means of firing pulse positioning used to fire at a proper firing angle. The present invention relates to a motor drive of the latter category.

The invention is based on the realization that the control circuit, which in a motor drive operates on the basis of the motor excitation voltage E, the fundamental AC current I fed into the machine, the angular velocity $\omega$ and the operative torque T, must perform several functions some of which are interrelated. Thus, the inverter firing advance angle $\beta$ is defined by a function of the form:

$$\beta = f_1(E, I, \omega, T) \tag{1}$$

So is the commutation margin angle $\delta$ given by:

$$\delta = f_2(E, I, \omega, T) \tag{2}$$

While $\beta'$ is the displacement angle of the fundamental component of motor line current I expressed by:

$$\beta' = f_3(E, I, \omega, T) \tag{3}$$

All angles are referenced to the voltage "behind the subtransient reactance". The AC current I fed into the machine is proportional to the current $I_{dc}$ flowing in the DC link which in turn depends on $V_{dc}$. That such relations exist is demonstrated in the article by J. Rosa entitled "Utilization and Rating of Machine Commutated Inverter-Synchronous Motor Drives" in IEEE Transactions Vol. 1A-15 No. 2 March/April 1979. For the purpose of this disclosure, the Rosa article is hereby incorporated by reference.

The excitation voltage E is defined in Electric Machinery (Third Edition) by A. E. Fitzgerald, Charles Kingsley, Jr., and Alexander Kusko, published 1971 by McGraw-Hill (see chapter 6 pages 284-287, 290-291).

The present invention, like in the U.S. Pat. No. 3,840,799, uses firing pulses which are generated at a motor speed matching rate, but without pulse "positioning". In the aforementioned patent, though, $E/\omega$ was kept constant. Not necessarily so, according to the present invention, thereby to extend the operative range under the control circuit. According to the present invention, a control circuit is provided operating at all motor loads, but without any need for measuring the torque T of the motor.

Referring to the afore-stated equations (1), (2) and (3), it is observed that $E/\omega$ is in a one-to-one relationship with the motor field current $I_f$. Equations (1), (2), (3) indicate the degree of freedom in the drive system. Let it be assumed that under steady state conditions the torque $T = T_1$, i.e. the torque generated by the motor, equals the torque represented by the load with an angular velocity $\omega$ = constant. Under such conditions, prior art control schemes would keep $\beta$, I and $I_f$ (and thereby $E/\omega$) under control. This forces the torque T to assume a value defined by equation (1) and it also forces the commutation margin angle $\delta$ to assume a value defined by equation (2). If the resultant motor torque T happens to be matched by the actual $T_1$ load torque, the system will remain in the steady state. However, if $T \neq T_1$, the drive has either a torque "surplus", or a torque "deficit". As a result the motor will accelerate, or decelerate, until the five variables $\beta$, E, I, $\omega$, T reach an equilibrium condition. The new E, I, $\omega$, T values, then, define a new commutation margin angle $\delta$. With this approach, the operator has no control on $\delta$ which therefore, might reach a faulty value.

In contrast, as equations (1) and (2) indicate, angles $\beta$ and $\delta$ are uniquely defined provided specific I=f(T) and $E/\omega$=g(T) relationships are imposed by the control circuit. This means that if the inverter firing pulses are delivered at the rate corresponding to the desired $\omega$ motor velocity, but without regard otherwise to their relative phase position, the rotor will assume a position with respect to the rotating stator EMF such that it will make $\beta$ and $\delta$ assume the values defined by equations (1) and (2). Thus, if the control circuit maintains properly defined I=f(T) and $E/\omega$=g(T) relationships, any additional effort to "position" $\beta$ or $\delta$ becomes redundant. In addition, it is further realized that for given $\omega$ and T, a multitude of pairs of E and I values results in a desired $\delta$ and thus the sytem has additional degrees of freedom which permit shaping of selected operating characteristics in addition to determining a line commutation margin angle $\delta$.

SUMMARY OF THE INVENTION

Accordingly, a control circuit is provided, according to the present invention, which automatically establishes an AC current I fed into the synchronous motor such that I=f(T), and which at the same time imposes E/ω=g(T) such that a minimum safe commutation margin angle δ is established, thereby insuring, a proper firing advance angle β from an associated firing pulse generator operated at the current angular velocity rate but without "positioning".

The invention, while imposing a favorable commutation margin angle δ, further provides for one or more performance criteria, taking advantage of the degree of freedom exhibited by the drive system on account of the aforementioned equations (1), (2) and (3). For instance, a favorable displacement angle β' for the fundamental component of the motor line current I is provided by the control circuit according to the invention, thereby maximizing the efficiency of the motor drive.

More generally, concurrently with gating of a motor converter without angular positioning of the firing pulses, the invention provides for imposing pre-established relationships between the motor drive variables so as to insure at all times a safe commutation margin angle δ and to obtain drive characteristics which are the most desirable for a given application. Some desirable characteristics achieved with the control circuit according to the invention are, besides the increased line power factor earlier mentioned, reduced excitation losses; reduced combined stator and excitation losses. This recitation is not limitative.

BRIEF DESCRIPTION OF THE DRAWINGS

FIGS. 6A, 6B illustrates with curves one control mode of operation of the motor drive according to FIG. 5;

FIG. 11 illustrates for selected values of the commutation margin angle, the angular velocity and the torque, the locus of operative pairs of the excitation voltage and the input current of the motor drive.

DETAILED DESCRIPTION OF THE INVENTION

Figure 1:
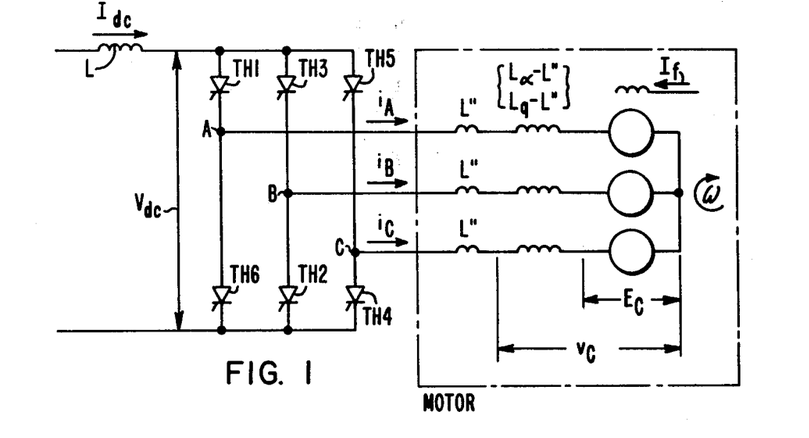
FIG. 1 is the equivalent diagram of the inverter-synchronous machine of the drive system.
Figure 2:
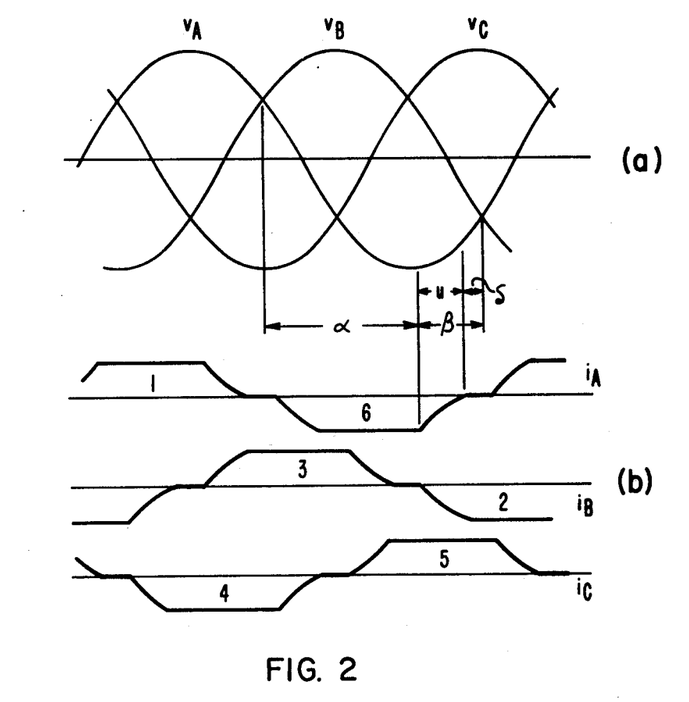
FIG. 2 illustrates with curves the line currents and line voltages in relation to the diagram of FIG. 1.
Figure 2:
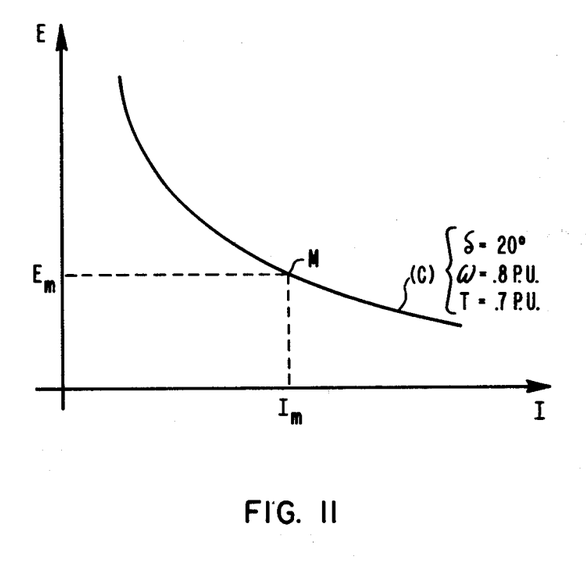

Referring to FIG. 1, the equivalent diagram of an inverter-synchronous machine of the AC drive system is shown. The inverter includes, typically, six naturally commutated thyristors TH1-TH6 mounted in a bridge between the two polarity terminals of a DC link having a terminal voltage $V_{dc}$ and an inductance L. The DC link acts as a current source supplying AC line currents $i_A$, $i_B$ and $i_C$ to the respective phases of the motor represented as an AC source. ω is the angular frequency of the source into which the converter regenerates, representing the motor speed. L" is the source inductance per phase, representing the motor's subtransient inductance. In Appendix are provided mathematical expressions describing the operation of such a 6-pulse thyristor converter in the inversion mode. When the thyristors are gated at a firing delay angle α, the firing angle β is defined as the complementary angle β=180°−α, measured from the 210° point of the line-to-neutral voltage pertaining to the particular thyristor next to be fired. This reference is also the zero cross-over point of the line-to-line voltage pertaining to the thyristor to be commutated and the thyristor to be fired. Referring to FIG. 2, AC line voltages $V_A$, $V_B$, $V_C$ (curves (a)) are shown together with the line currents $i_A$, $i_B$, $i_C$ (curves (b)). The delay angle α and firing angle β are indicated. Following gating at angle β, a commutation overlap angle of angular duration u follows as shown in FIG. 2. At the termination of commutation overlap, the thyristor just commutated becomes reverse biased for an angular duration δ, where δ=β−u. This is the "commutation margin angle". This angle δ defines the time available for the thyristor to recover. It is, therefore, important that δ be given a safe minimum value.

In the Appendix, based on FIGS. 1 and 2, mathematical expressions are given in terms of cos δ and cos β, of $I_{dc}$, $V_{dc}$ and $P_{dc}$, (the DC power drawn by the converter which is equal to the AC power inverted and fed into the AC source, when the losses are ignored). Moreover, in the Appendix is given the expression:

$$\cos \beta' = \frac{\cos \delta + \cos \beta}{2},$$

where β' is the displacement angle of the fundamental component of the motor line current I. Angles β, δ and β' are referenced to the voltage V behind the subtransient reactance L".

Figure 3:
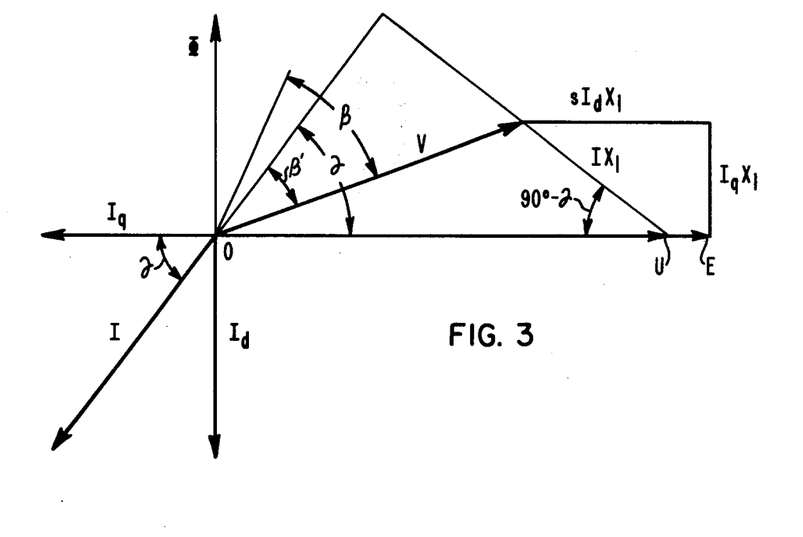
FIG. 3 is a vector diagram of the system of FIG. 1.

Referring to FIG. 3, a vector diagram is provided of the inverter-synchronous machine system. It is assumed that the subtransient inductance L" (FIG. 1) sees the entire line current ($i_A$, $i_B$ or $i_C$ of FIG. 2) whereas the direct and quadrature axis synchronous inductances $L_d$ and $L_q$ see only the direct and quadrature axis components (quadrature current vectors $I_d$ and $I_q$ are represented on FIG. 3) of the fundamental component of the motor line current I. The fundamental line current I leads the voltage V "behind the subtransient reactance" by the displacement angle β', which is the result of the inverter being gated at the firing angle β. The direct and quadrature axis components of I cause voltage drops $sI_dX1$ and $I_qX1$ across three respective adjusted synchronous reactances which, when vectorially added to V provide the induced voltage, or excitation voltage E. This voltage E is a fictitious voltage providing a measure of the required pole excitation under field current $I_f$. There is also a voltage U shown on FIG. 3 behind the E vector and aligned with it. U is the "voltage behind the synchronous reactance". It satisfies the following power equation:

$$P_{OC} = P_{AC} = 3\ VI\cos\beta' = 3\ UI\cos\gamma$$

where $\gamma$ is the torque angle of the machine. Therefore, U represents power, while E represents excitation. If the rotor is cylindrical, $s=1$ and $U=E$.

In Appendix are provided calculations and equations by which it is easy to conclude that $\cos\beta$, $\cos\beta'$ and $\cos\delta$ are known as a function of I, U and a trigonometric expression of $\omega$. In particular, $$\cos\gamma = \frac{\omega T}{3UI}\text{ and }P = \omega T$$

As a result, it is clear that $\beta$, the firing angle $\delta$, the commutation margin angle, and $\beta'$ the displacement angle are each a function only of E, I, $\omega$ and T, namely $$\beta = f_1(E, I, \omega, T) \quad (1)$$

$$\delta = f_2(E, I, \omega, T) \quad (2)$$

$$\beta' = F_3(E, I, \omega, T) \quad (3)$$

where T is the mechanical torque generated by the motor, $\omega$ is the angular velocity, E is the motor "excitation voltage", and I is the fundamental component of the motor line current.

When the motor is running at an angular speed $\omega$, with a torque T assumed to be sensed, the aforementioned equations (1), (2), (3) show that for such given values of $\omega$ and T the system has degrees of freedom, e.g. depending on what E and I will be at any operative condition, $\beta$ and $\delta$ will be determined. Therefore, by choosing E and I, through a computation of $\beta$ and $\delta$ (which are known only by iteration effected on transcendental functions as shown in the Appendix) it is possible to verify and insure that $\delta$, and therefore $\beta$, be above the minimum required for safe commutation.

According to the present invention, this general approach which requires the knowledge of the torque as well, is improved by choosing I so that it be itself a known function of T, whereby automatically only I has to be known and T will be known without having to sense the torque.

The invention will be illustrated with the choice for such function of $I=T$ (on a per-unit scale). This has been found experimentally to insure a satisfactory commutation margin angle $\delta=20°$ with a synchronous motor having a pole saliency factor of 0.8 and a subtranscient-to-direct axis synchronous reactance ratio of 0.25. Under such conditions $\delta=20°$ is a safe value at $\omega=1$ P.U. nominal speed. This insures proper matching between the DC link, the motor converter and the motor as necessary for maximum utilization of the power handling ability of the motor.

Figure 4:
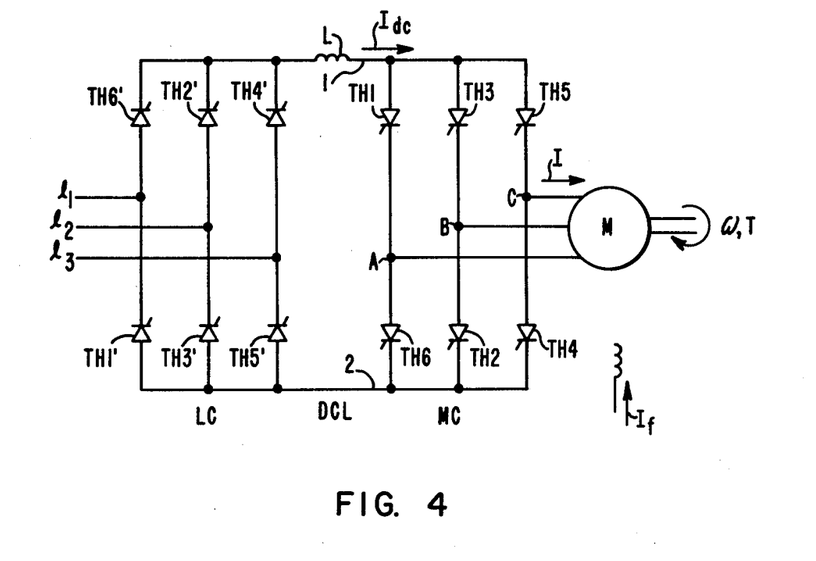
FIG. 4 is a schematic representation of an inverter-synchronous machine motor drive.

Referring to FIG. 4, a synchronous motor drive includes (1) a line converter LC supplied with AC lines $l_1$, $l_2$, $l_3$ and having thyristors TH1'-TH6'; (2) a DC link DCL comprised of DC terminals 1 and 2 with an inductance L; (3) an inverter, or machine converter MC having thyristors TH1-TH6 and supplying AC current to phases A, B, C of (4) a synchronous motor M having a field winding excited with current $I_f$. The angular speed is $\omega$, the torque is T. The static switches are naturally commutated, those on the AC lines side by the AC input voltages, those on the motor side by the EMF's of the motor. All this is generally know. As earlier stated the DC link acts as a DC current source.

From what has been said earlier, in consideration of the variables E, $\omega$, I and T which are the parameters in the three afore-mentioned equations (1), (2), (3) for $\beta$, $\delta$ and $\beta'$, respectively, it is conceived, according to the present invention, to establish a function $I=f(T)$ such that with the sensed and controlled parameter I, there will be no need to sense the torque T (I being the fundamental component of the motor line current). Secondly, also according to the present invention, a function $E/\omega=g(T)$ is established. With $I=f(T)$ and $E/\omega=g(T)$, between equations (1), (2) and (3) the angles $\beta$ and $\delta$ will be determined. The problem is, thus, to choose f(T) and g(T) so that $\delta$ defined by equation (2) assumes a safe value for all values of T, and $\omega$ (which also applies to all corresponding paired values I and E during operation). If $\delta$ is so inherently restricted, $\beta$ will automatically be acceptable, as defined by equation (1).

Accordingly, the following invention proposes to control I and $E/\omega$ automatically as functions of T without measuring the torque, the function being such that the commutation margin angle $\delta$ remain safe at least during a preferred range of operation, preferably up to maximum power per-unit.

Figure 5:
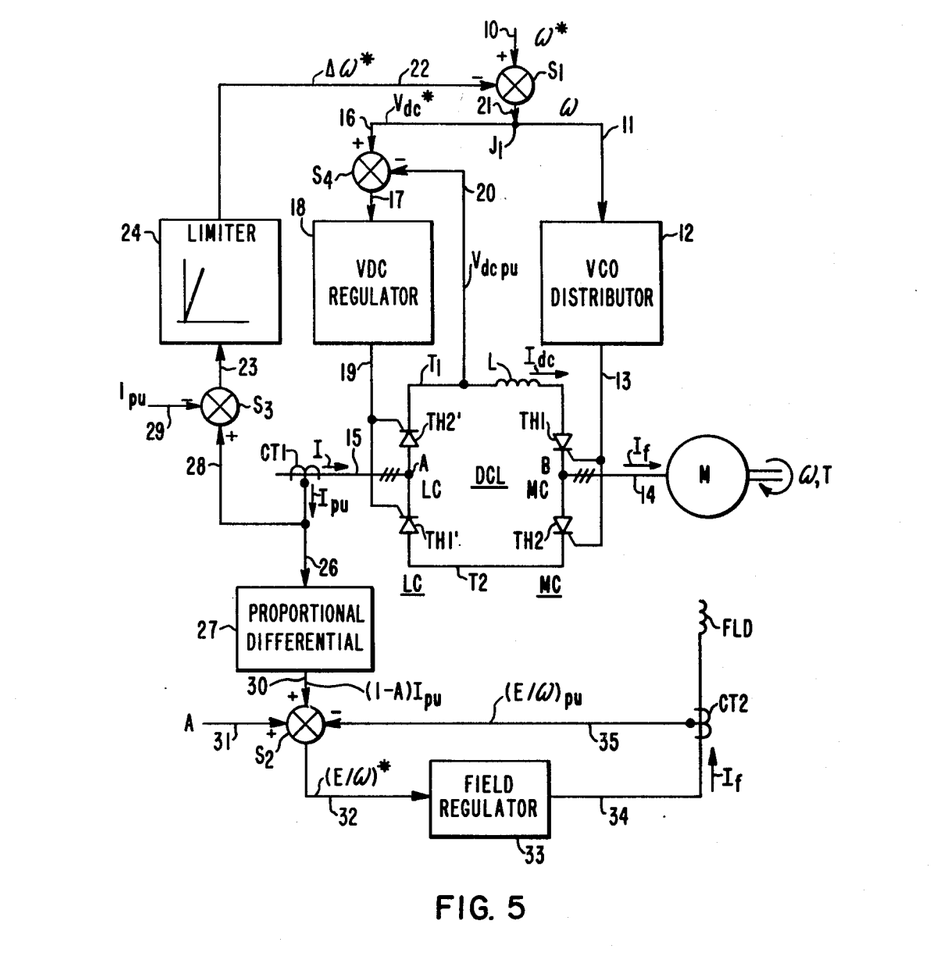
FIG. 5 is a block diagram of the control system of an inverter-synchronous machine motor drive according to one embodiment of the present invention.

Referring to FIG. 5, a block diagram of the control system of an inverter-synchronous machine motor drive according to the invention illustrates one embodiment thereof.

The motor drive includes: an AC line supply schematized by lines 15; a line converter LC schematized by thyristors TH1', TH2' generating a voltage $V_{dc}$ between terminals T1, T2 of a DC link DCL including an inductance L; a machine converter MC schematized by thyristors TH1, TH2, operating as an inverter to supply AC current on lines 14 to a synchronous motor M rotating at angular speed $\omega$ and exerting torque T. The motor has a field winding FLD supplied with field current $I_f$ on line 34 from a field regulator 33. The thyristors of the line converter are controlled from a regulator 18 itself controlled, through a closed loop by line 20, in relation to the voltage $V_{dc}$, established across the DC link. The field regulator 33 is controlled in relation to $E/\omega$ by a closed loop from generated current $I_f$ (current sensor CT2, line 35, summer S2 and line 32).

In accordance with the present invention, the thyristors TH1-TH6 of the machine converter MC are gated at a rate equal to the angular speed $\omega$. To this effect, the desired speed $\omega^*$ derived on line 10 is applied to a summer $S_1$, the function of which will be explained hereinafter, and is inputted by lines 21 and 11 into a voltage controlled oscillator (VCO). The VCO is combined with a distributor circuit delivering, via lines 13, firing pulses to the control electrodes of the machine converter, thus, at a rate $\omega$. However, no positioning of the pulses is provided at this point. Effective positioning in relation to the applied voltage curves ($V_A$, $V_B$, $V_C$ of FIG. 2) is achieved, as explained earlier, by choosing functions $I=f(T)$ and $E/\omega=g(T)$ as function of the torque, without having to sense the torque T. To establish the chosen $I=f(T)$ relationship without the necessity of actually sensing T torque, the line converter LC is controlled to provide a DC voltage $V_{dc}$ proportional to $\omega$ velocity. Therefore, $V_{dc}=\omega$ (on a per-unit scale). Thus, $V_{dc}/\omega=1$. Since $T=P/\omega=V_{dc}I_{dc}/\omega$ (where P is the power developed by the motor), when $V_{dc}/\omega=1$ P.U., $I_{dc}=T$. However, $I_{dc}$ is proportional to I, therefore I=T (on a per-unit scale). It should be noted that even though the output voltage $V_{dc}$, rather than the output (link) current $I_{dc}$ of the line converter, is the controlled variable, due to the presence of DC link reactor L, the line converter still can be considered as a DC current source.

As to the $E/\omega = g(T)$ relationship, this is established by maintaining $E/\omega = A + (1-A)I$, e.g. a linear relationship between $E/\omega$ and I. Since I=T, $E/\omega = A + (1-A)T$.

In order to implement I=T, as earlier stated, $V_{dc}/\omega = 1$ is to be achieved. To this effect, from line 21, via line 16 the reference signal $\omega^*$ is derived and used as a reference signal $V_{dc}^*$ for $V_{dc}$ in the loop, thus applied to a positive reference input of summer $S_4$. At the negative input thereof is applied the actual value of $V_{dc}$ derived from the DC link via line 20. Any error on line 17 at the output of summer $S_4$ is in turn applied to voltage regulator 18 which controls by lines 19 the firing of the thyristors TH1'-TH6' of the line converter, thereby to maintain $V_{dc} = \omega$ in the DC link.

As to the function $E/\omega = A + (1-A)T$, this is implemented by applying to the closed-loop of the field regulator 33, a refernce signal $(E/\omega)^*$ equal to $A + (1-A)I_{pu}$, namely as a positive signal into summer $S_2$, where the actual signal $(E/\omega)_{pu}$ from $CT_2$ and line 35 is subtracted by the summer. The portion $(1-A)I_{pu}$ of the refrence signal is derived on line 30. The current is obtained from a current transformer $CT_1$ sensing the link current $I_{dc}$, indirectly from the AC lines of the line converter. After rectification and proper processing by a proportional-differential circuit 27 (where the differential function serves to anticipate the delay of the motor field circuit) the value $(1-A)I_{pu}$ is generated. The constant value A is separately derived on line 31. Lines 30 and 31 are added into summer $S_2$. Accordingly, field regulator 33 maintains $(E/\omega)_{pu}$ proportional to $A + (1-A)I_{pu}$ as stipulated.

This control circuit will insure that the motor drive in operation under normal load conditions maintains a margin angle $\delta$ for the motor converter above a minimum safe value. Should, however, the motor torque T exceed 1 P.U. due to overload, or excessive acceleration demanded by a sudden increase of $\omega$, then, the margin angle $\delta$ would decrease to an unsafe level and commutation fault could occur. Such malfunction is prevented by providing a current limiting circuit 24 which is a threshold circuit. From current transformer $CT_1$ by lines 26 and 28 a signal representative of I is fed into the positive input of a subtractor $S_3$, a signal representative of 1 P.U. for I being fed into the negative input thereof. As a result, a signal proportional to $(I_{pu} - 1)$ is inputted by line 23 into current limiter 24. If the line current I exceeds 1 P.U. as the result of an excessive torque, the current limiter 24 becomes operative to output on line 22 a signal $\Delta \omega^*$ sharply rising in proportion to $(I_{pu} - 1)$, to the extent that $I_{pu}$ exceeds unity. The signal of line 22 is subtracted from the velocity reference $\omega^*$ of line 10 in summer $S_1$. This results in two simultaneous effects: (i) $V_{dc}$ on line 16 is reduced to effectively limit I to 1 P.U. and thereby the motor torque T is held to 1 P.U. Under overload conditions this results in a torque "deficit" and thus a slow-down of the motor. Under excessive acceleration it results in moderating the rate of change of speed. (ii) $\omega$ on line 11 is reduced (or its rate of change limited) thereby to maintain synchronism of the gate pulses. Even if a commutation fault occurs, the current limiter 24 will limit $I_{dc}$ to 1 P.U.

The invention will be further explained by choosing two examples showing computed steady state performance of a motor drive using the preceding control system, but with two different slopes selected for the characteristic $E/\omega = A + (1-A)I$ chosen by selecting specific values for A.

Figure 6A:
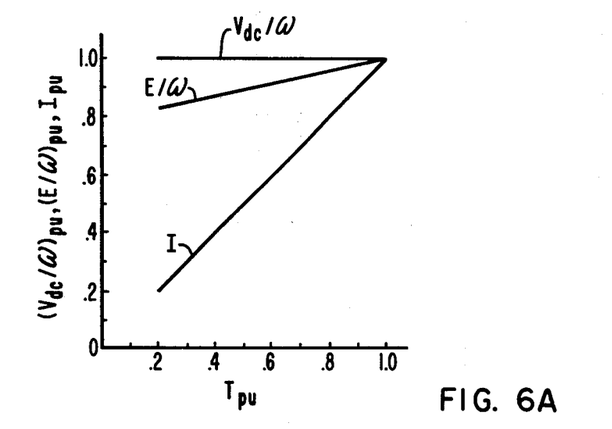
FIG. 6A shows the operative characteristic and FIG. 6B shows the curves of β, β' and δ with some control mode.
Figure 7A:
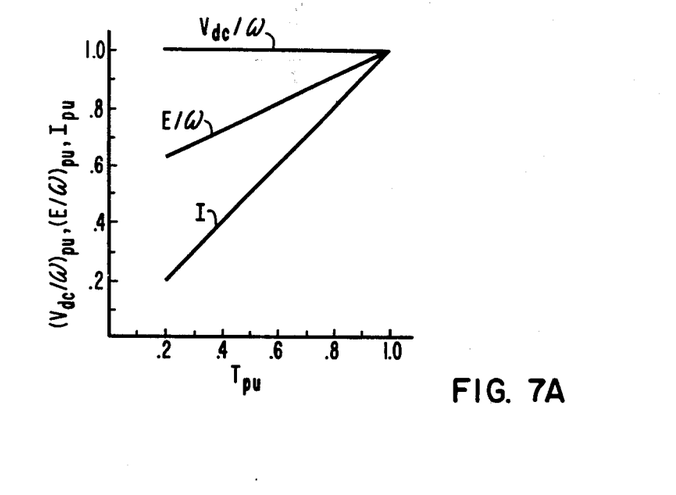
FIGS. 7A, 7B are curves like in FIGS. 6A, 6B for another control mode of operation of the motor drive of FIG. 5.

Referring to FIGS. 6A, 7A the motor drive characteristics $V_{dc}/\omega$; $E/\omega$; and I as a function of the normalized torque $T_{pu}$ are illustrated in two respective embodiments. $V_{dc}/\omega$ is equal to 1; $E/\omega$ is linear as a function of T, depending on the value of A; I is a line inclined at 45 degrees, since I=T.

EXAMPLE 1

With the selection of A=0.7825, $$E/\omega = 0.7825 + 0.2175I$$

also, I=T and $V_{dc}/\omega = 1$ $E/\omega$ extends from 0.7825 to 1.00 when the torque varies from 0.2 to 1.0 as shown graphically in FIG. 6A.

Figure 6B:
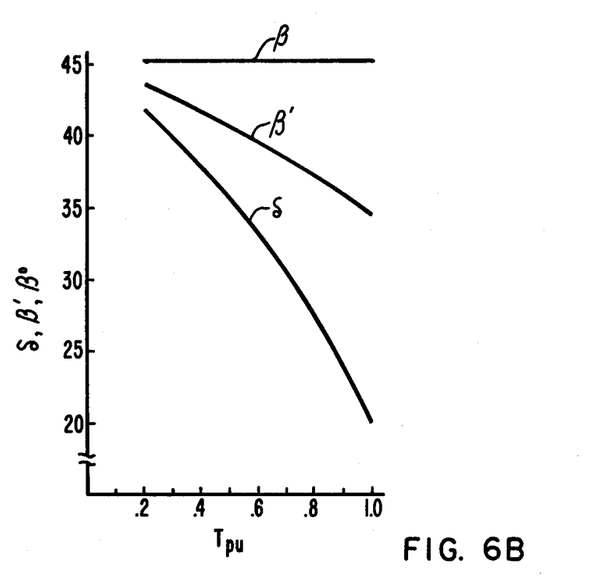

The performance characteristics corresponding to Example I are graphed in FIG. 6B. As can be seen, for the given motor, this control scheme results in $\beta = 45.4°$ firing angle over the entire 0.2 to 1.0 P.U. torque range, accomplished without the necessity of actually "positioning" the firing pulses. The commutation margin angle is $\delta = 20°$ at 1 P.U. torque but gradually increase to 41.9° as the torque decreases to 0.2 P.U. The $\beta'$ displacement angle of motor current I is 34.8° at 1 P.U. torque, increasing to 43.7° at 0.2 P.U. torque, with coresponding displacement factors ranging from cos $\beta' = 0.82$ to 0.72. It can be seen that with this control scheme, decreasing torque results in increasing commutation margin angle and decreasing displacement factor meaning that the unnecessary increase of margin angle at fractional loads is obtained at the expense of poorer motor utilization and efficiency.

The ratio of peak-to-peak torque pulsation to average torque is $\Delta T/T = (\pi/3) \cdot \tan\beta'$. Therefore, with such control scheme the torque pulsation increases from $(\pi/3) \cdot \tan 34.8° = 0.73$ P.U. at 1 P.U. torque to $(\pi/3) \cdot \tan 43.7° = 1.0$ P.U. at 0.2 P.U. torque. This corresponds to the performance characteristics of a state-of-art control system which "positions" the firing angles at $\beta = 45.4°$ and maintains an I=T equality.

EXAMPLE 2

This example illustrates the additional degree of freedom available to improve motor drive characteristics. With the selection of A=0.5475.

$$E/\omega = 0.5475 + 0.4525I$$

also, I=T and $V_{dc}/\omega = 1$

Figure 7B:
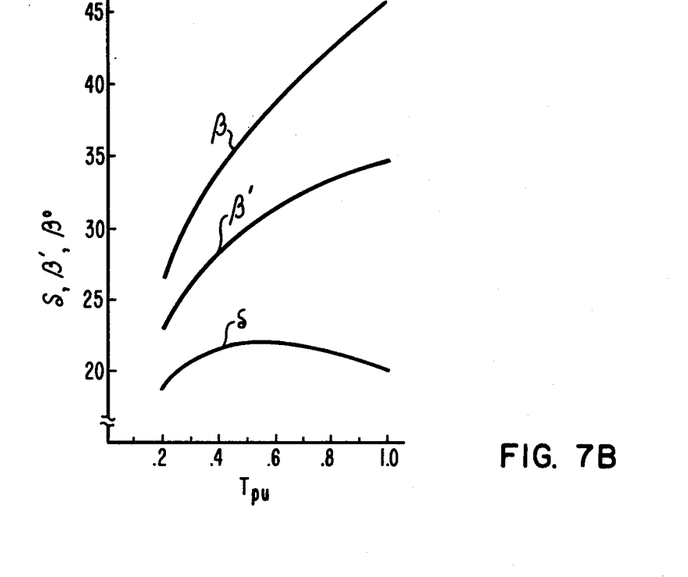

This time the characteristic $E/\omega$ extends from 0.6 at a torque of 0.2 to 1.0 at a torque of 1.0 as shown in FIG. 7B.

FIG. 7A illustrates with curves the operative characteristics $V_{dc}/\omega$; $E/\omega$ and I of the motor drive. FIG. 7B shows the curves $\beta$, $\beta'$ and $\delta$ under Example 2. There appears to be an overall improvement, expecially since $\delta$ is maintained generally close to the safe value of 20° in a range extending from 0.2 to 1.0 T P.U. load.

Moreover, the control scheme according to Example 2 (FIG. 7B) results in a decreasing firing angle $\beta$ with decreasing torque, with the indirect result of decreasing displacement angle $\beta'$ with decreasing torque, while $\delta$ margin angle is kept practically constant at 20°. The corresponding displacement factor increases from $\cos\beta'=0.82$ at 1 P.U. torque to 0.92 at 2 P.U. torque. The effect of this improved motor utilization shows up as a reduction of excitation losses at fractional loads. At 0.2 P.U. torque these losses, proportional to $(E/\omega)^2$, amounted to 0.68 P.U. in Example 1; they are 0.41 P.U. in Example 2. The task of varying $\beta$ firing angle in order to maintain $\delta$ margin angle constant at 20° under varying load is here again, accomplished without the need for actually "positioning" the firing pulses.

This control scheme results in a decreasing torque pulsation at fractional loads; $\Delta T/T$ decreases from 0.73 P.U. at 1 P.U. torque to 0.51 P.U. at 0.2 P.U. torque, a significant improvement over Example 1.

With the above two examples the control algorithm calls for maintaining the DC link voltage $V_{dc}$ proprotional to $\omega$, the motor velocity. As a result, the DC link current $I_{dc}$ is proportional to torque. Therefore, the current signal can also be used as a torque signal.

More generally, with a proper selection of the $E/\omega=f(T)$ relationship, the motor converter can be made to commutate any current up to 1 P.U., and consequently, the motor will be capable of handling any torque up to 1 P.U. over the entire speed range. As stipuled, 1 P.U. is the highest torque available from the machine at $\delta=20°$ margin angle. A corollary of this mode of operation is that since the DC link voltage $V_{dc}$ is proportional to motor velocity, so is the line power factor. This is due to the fact that the line converter has an input power factor which is proportional to the DC voltage it delivers. Thus, reduced speed operation results in proportionally reduced input line power factor.

However, when analyzing the above-stated equations (1), (2), (3) it appears that $V_{dc}$ can be maintained at the 1 P.U. level over a limited speed range: $\omega_1 \leq \omega \leq 1$ P.U., without impairing safe commutation. In such limited velocity range for which $V_{dc}=1$ P.U., the drive will operate at maximum (near unity) input line power factor. Below the so defined velocity range, e.g. where $V_{dc}$ must be decreased, the input line power factor will decline. Nevertheless, it will still remain higher than in the previously illustrated cases. This situation is illustrated by the broken line ACB on the chart of FIG. 8. ($V_{dc}$ is shown as a function of $\omega$ in a normalized per-unit scale.) Line AB applies to the aforementioned examples 1 and 2. As earlier stated, reduced speed operation results in a proportionally reduced $V_{dc}$. If, however, $V_{dc}$ can be maintained at its maximum level 1.0 from B to C, namely down to speed $\omega_1$ ($\omega_1$ is illustratively shown to be 0.8 in FIG. 8), $V_{DC}$ will decrease from C to A when velocity goes down from $\omega_1$ to zero. Nevertheless, all along $V_{dc}$ remains higher in this lower range than for any value along AB examples 1 and 2, which means an overall higher input line power factor.

To accomplish such desirable mode of operation, $V_{dc}$ should be such as to satisfy the following equations:

$V_{dc} = \omega/\omega_1$ P.U. for velocities $\omega < \omega_1$ and
$V_{dc} = 1$ P.U. for $\omega_1 < \omega \leq 1$ P.U.

By a proper selection of the remaining control algorithm, the motor converter can still be made to commutate at safe commutation margin angles $\delta$, without the necessity of actually "positioning" the firing pulses.

The level of velocity $\omega_1$ down to which maximum input line power factor can be maintained depends on the torque vs. speed characteristics of the load and on the extent the motor may be derated to make this high power factor operation feasible.

Figure 9:
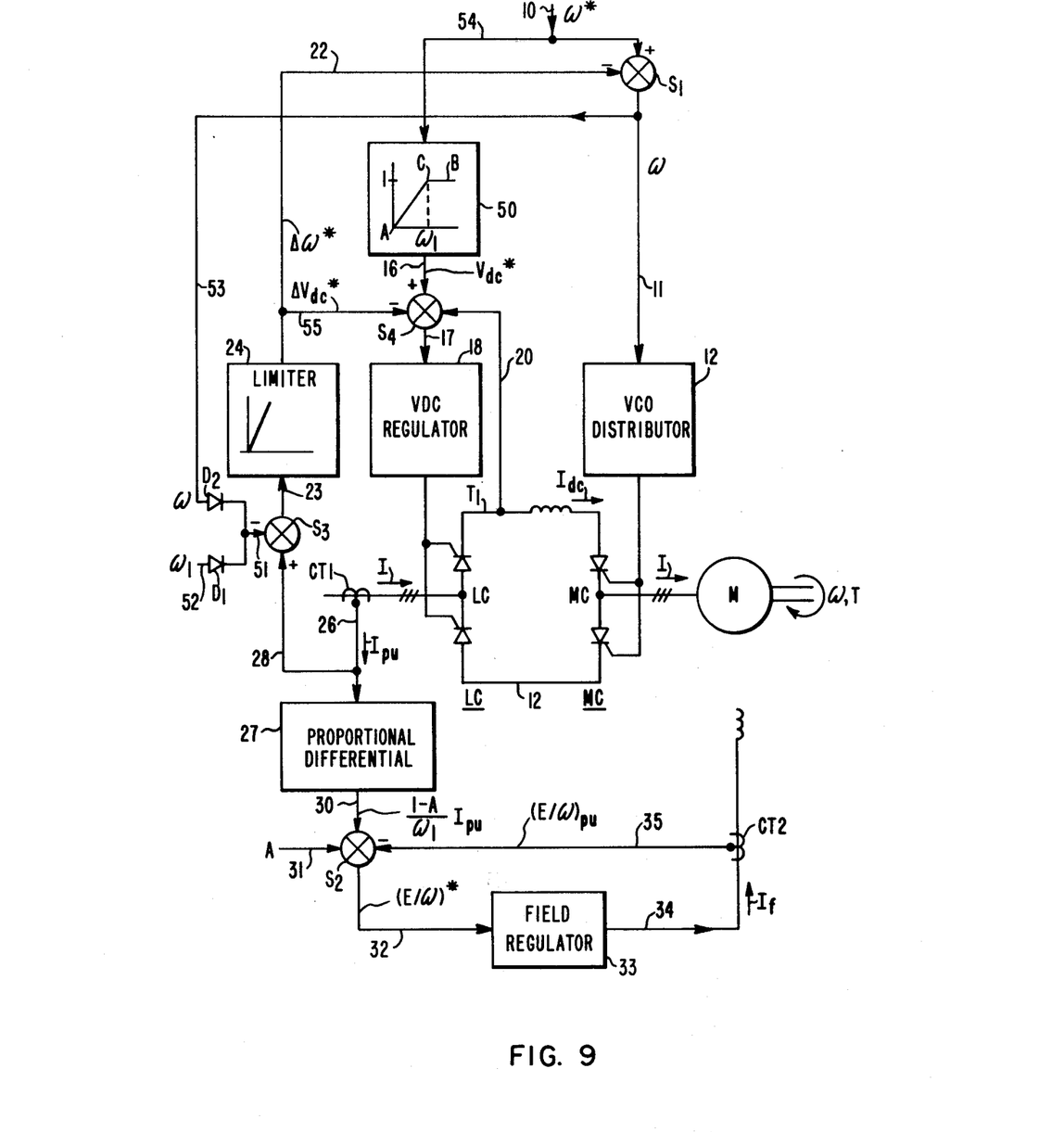
FIG. 9 is a block diagram of the control system of an inverter-synchronous machine motor drive according to the embodiment of FIG. 8.

Implementation is as shown by the block diagram of FIG. 9. In this embodiment it is assumed that the motor must be able to handle 1 P.U. torque over the entire speed range. It is further assumed that the motor used in the first two examples is now being used without derating to accommodate such high power factor control algorithm.

| Speed Range | $\omega < \omega_1$ | $\omega_1 \leq \omega \leq 1$ |
|---|---|---|
| $V_{dc}$ | $\omega/\omega_1$ | 1 |
| $V_{dc}/\omega$ | $1/\omega_1$ | $1/\omega$ |
| I, $I_{dc} = P/V_{dc}$ | $\omega_1 T$ | $\omega T$ |
| $E/\omega = A + (1-A)I/\omega_1$ | $A + (1-A)T$ | $A + (1-A)T(\omega/\omega_1)$ (but not exceeding 1) |

In this implementation, the block diagram of FIG. 7 is similar to the one of FIG. 5 except for the following three modifications:

(1) The block 27 is such that its output on line 30 equals $(1-A)I_{pu}/\omega_1$ and the reference to summer $S_2$ reaches a ceiling of 1 P.U. at $I=\omega_1$ P.U.

(2) $V^*_{dc}$ reference signal of line 16 is obtained by feeding velocity reference $\omega^*$ from line 54 through a function block 50 having a $1/\omega_1$ gain (portion AC of the characteristic) and an output ceiling at 1 P.U. (along CB, e.g. beyond speed $\omega_1$).

Figure 10A:
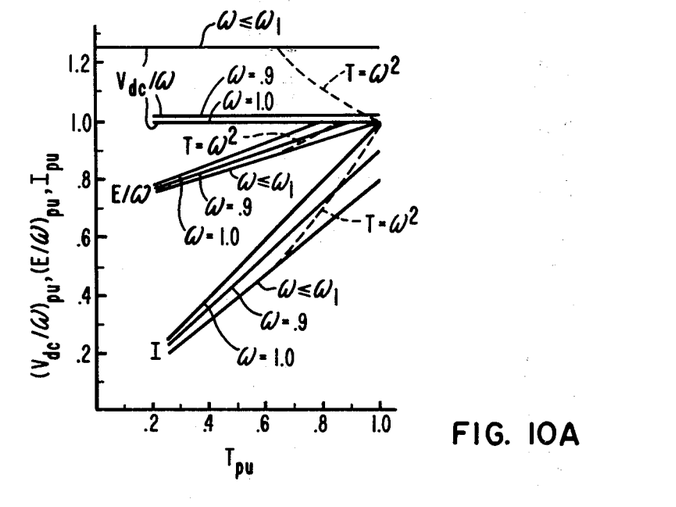
FIGS. 10A and 10B compare the operational characteristics of the motor drive and correlative values of β, β' and δ under the embodiment of the invention per FIGS. 8 and 9.

(3) The current limit loop about block 24 is devised so as to track the characteristics $I=f(T,\omega)$ (shown in FIG. 10A). To implement this, the $I_{pu}$ current signal (derived from $CT_1$ on line 26) is derived on line 28 and compared by subtractor $S_3$ with a variable "current limit reference" on line 51. Latter is obtained by "auctioneering" with steering diodes $D_1$, $D_2$ a constant signal equaling $\omega_1$ P.U. on line 52 or a variable signal equaling $\omega$ P.U. (whenever $\omega > \omega_1$) on line 53, respectively. The larger of the two acts as the current limit reference on line 51. Thus, at motor speeds below $\omega_1$ P.U. the current limit of block 24 is activated by line 23 whenever the current I on line 28 happens to exceed the $\omega_1$ P.U., signal of line 52. At motor speeds above $\omega_1$; the current limiter 24 is activated whenever I on line 28 exceeds the limit $\omega$ P.U. e.g. the signal derived on line $S_3$ from line 10 and summer $S_1$. The output of the current limiter is used, on line 55 to summer $S_4$, to decrease $V_{dc}$ and effect by line 17 and voltage regulator 18 a reduction of I by reducing the dc link voltage reference level (signal $\Delta V_{dc}^*$). The output of limiter 24 is also used to reduce $\omega$ on line 11 and therefore the rate of inverter firing pulses (signal $\Delta\omega^*$ on line 22) thereby, to maintain synchronism under decreasing motor speed.

Figure 8:
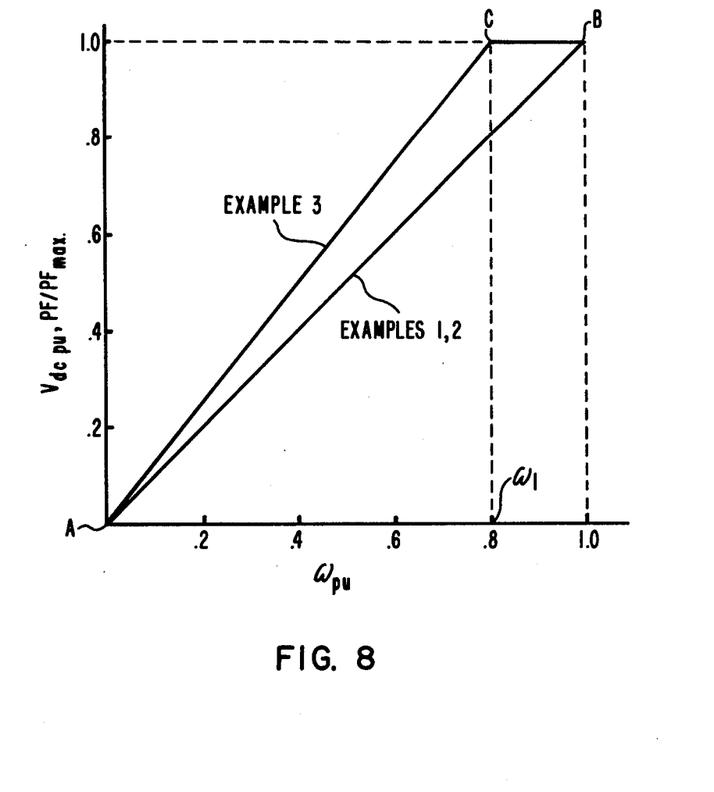
FIG. 8 is a curve characterizing a third embodiment of the invention.
Figure 10B:
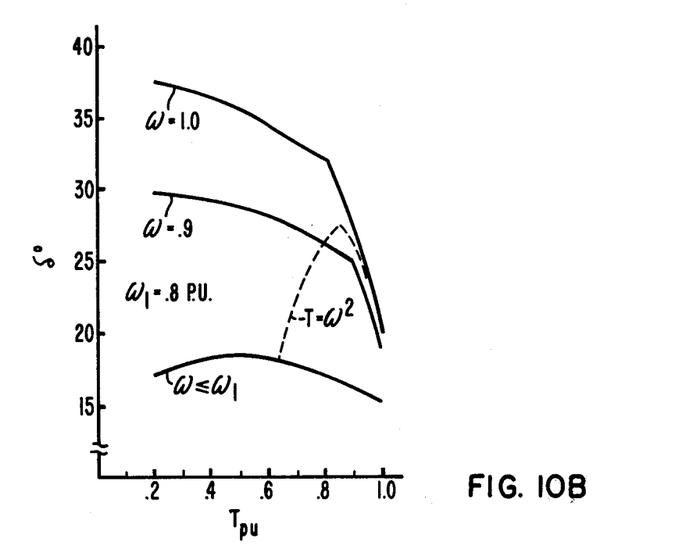

Referring to FIG. 10A, when selecting $A=0.7$ and $\omega_1=0.8$ P.U., control characteristics $(V_{dc}/\omega)_{pu}$; $(E/\omega)_{pu}$ and $(I)_{pu}$ are shown to illustrate the operation of the control system of FIG. 9. The turn-off margin angle $\delta$ charateristics are shown in FIG. 10B for $\omega=1.0$; $\omega=0.9$ and $\omega > \omega_1$ respectively. It can be seen that at speeds higher than $\omega_1=0.8$ P.U., $\delta$ and $E/\omega$ are functions of both torque and velocity (see the family of curves in FIGS. 10A, 10B). At and below speed $\omega_1=0.8$ P.U., there is a single curve for the turn-off margin angle $\delta$. Even though $\delta$ drops below 20°, the turn-off margin time $\delta$ is still safe since it is proportional to $\delta/\omega$. This is clearly advantageous for the input line power factor as illustrated in FIG. 8. As earlier stated, the control modes according to Examples 1 and 2 provide a maximum input line power factor only at 1 P.U. speed.

Below 1 P.U. speed (line AB) the power factor decreases in proportion with speed. With the control mode just described maximum input power factor is maintained (line BC) down to $\omega_1 = 0.8$ P.U. speed. Below the latter value the power factor decreases (line AC) in proportion with speed but stays by a 25% amount above the values along AC obtained with the two aforementioned modes. This favorable characteristic is achieved at the expense of somewhat higher excitation losses at high speeds and fractional loads as implied by the large margin angles obtained under those conditions. The stator losses, however, are below those of the modes of Examples 1 and 2. At, say, 0.6 P.U. torque the stator losses (proportional to $I^2$) of Examples 1 and 2 are 0.36 P.U. The scheme used in Example 3 shows stator losses of 0.36 P.U., 0.29 P.U. and 0.23 P.U. at 1 P.U., 0.9 P.U. and 0.8 P.U. or lower speeds respectively.

The control mode of example 3 is particularly suitable for flow control applications, such as centrifugal pump, compressor and blower drives. In these drives the steady state torque is proportional to the second power of speed ($T = \omega^2$). For such a torque vs. speed characteristic the computed $\delta$ and $E/\omega$ values are illustrated in dotted line on FIGS. 10A, 10B. Thus, below 0.81 P.U. torque (or 0.9 P.U. speed) excitation losses decline faster with decreasing speed, and the drive still has a 1 P.U. torque capability to quickly accelerate to higher velocity settings.

The preceding illustrations of the invention show how functional relationships can be imposed on certain drive variables to take full advantage of the degrees of freedom offered by the system. In addition to insuring a safe commutation margin angle $\delta$ over the entire operating range without the need of angular positioning of the inverter firing pulses, thus approach makes it possible to shape the drive characteristics to best suit a given application. This is particularly advantageous with a control system of the digital control type, since the choice of control mode is done by merely selecting a proper control algorithm. Various algorithms can thus be conveniently implemented with microprocessor control, thereby taking advantage of software adaptability to standard hardware.

Referring to FIG. 11 and to equation (2) defining the commutation margin angle $\delta$, if in equation (2) the values of the desired margin angle $\delta$, of the given angular velocity $\omega$ and of the present torque T are subtituted, the equation can be solved for E, thus leading to a function $E = f(I)$. Such function is illustrated in FIG. 11 for the hypothetical case of $\delta = 20°$, $\omega = 0.8$ P.U. and $T = 0.7$ P.U.

This function represents all paired values of E and I and corresponding locus (c) of operative point M which at the given 0.8 P.U. angular velocity and 0.7 P.U. torque result in the desired $\delta = 20°$ margin angle, without angular positioning of the firing pulses. For a given motor the many values of $E = f(I)$ can be computed (with the help of mathematical expressions given in the Appendix) for the entire $\omega$ and T range in which the particular drive is designed to operate. A different curve (c) will correspond to any value of $\omega$ and T.

It is now observed that by controlling $I_f$, the field current, the value of the excitation voltage E is controlled.

Secondly, it is observed that the input current I is proportional to $I_{dc}$, the link current, which in turn is controlled by $V_{dc}$, the link voltage. Thus, a control system which controls $I_f$ and $V_{dc}$, has the ability of providing such pairs of E, I which result in the desired angle $\delta = 20°$, provided the control system: (a) is responsive to input signals $\omega$ and T and (b) is tailored to call for the particular computed (E, I) pair pertaining to such given $\omega$ and T.

Thirdly, it is observed that for a given $\omega$ and T, many pairs of E and I can lead to the condition $\delta = 20°$ being satisfied. In other words, the system has a redundant degree of freedom. A practical control algorithm eliminates this redundany by programming the control system so as to select from the many pairs of E and I a particular one which satisfies another imposed criterion for the motor drive. Thus, a certain requirement is imposed in addition to insuring $\delta = 20°$. This additional requirement will preferably be so as to provide a specific performance feature deemed desirable for a particular motor drive application. The following three features are an illustration of this:

(i) Control is programmed so as to maintain E at the lowest possible level compatible with $\delta = 20°$ at the given $\omega$ and T. As a result, the drive will operate with the lowest possible $I_f$ field current and thus with minimum excitation loss.

(ii) Control is programmed to maintain such pair of E, I as to be compatible with $\delta = 20°$ at the given $\omega$ and T while the sum $(I_f^2 R_f + 3I^2 R_s)$, representing stator and rotor copper losses, is at a minimum.

(iii) Control is programmed so as to maintain E at the highest possible level compatible with $\delta = 20°$ and the highest $V_{dc}$ as the line converter can provide while also not exceeding the maximum permissible excitation losses, at the given $\omega$ and T. As a result, the drive will operate at the largest input line power factor.

In order to enable the control system to perform according to the above stated principle, control must be tailored so as to provide specific (E, I) pairs in response to input signals representing $\omega$ and T. Of these two input variables $\omega$ is readily available by means of a tachometer. T, the torque generated by the motor, is available by computation from the relationship:

$$T = \frac{\text{Mechanical power}}{\omega} = \frac{\text{Electrical power}}{\omega} = \frac{V_{dc} I_{dc}}{\omega}$$

(This equation ignores motor losses but is sufficiently accurate for control purposes.)

Instead of analog treatment, a digital control system can be designed using a microprocessor which is programmed to compute T using input signals representing $V_{dc}$, $I_{dc}$ and $\omega$. It will, thus, have the information necessary to provide the corresponding specific (E, I) pair satisfying $\delta = 20°$ and the selected special feature, at a given $\omega$ and T, by using a look-up table stored in memory. The look-up table is computed using the equations listed in the Appendix to provide the $E = f(I)$ functions and selecting the (E, I) pairs which satisfy the defined operative criterion.

The invention has been illustrated with embodiments of the analog type. As earlier explained, with such systems the computation of T can be obviated (a) by maintaining the $V_{dc}/\omega$ ratio constant, in which case $I_{dc}$, and thus I, is a measure of T, or (b) by maintaining $V_{dc}$ constant (over a certain speed range) in which case $I_{dc}$, and thus I, is a measure of the $\omega T$ product. Instead of resorting to a look-up table, the analog system maintains a linear $E/\omega = A + (1 - A)I$ relationship for which the constant A is determined by computation so as to yield (E, I) pairs which approximate the $\delta=20°$ requirement and also a selected special feature at the given $\omega$ and T. This can also be achieved with a digital system programmed to implement the same operation illustrated in analog form.

More generally, it appears that for a given angular velocity $\omega$ and torque T, by controlling I as a predetermined function of T and $\omega$, (I=f(T,$\omega$)) and by controlling E as a predetermined function of T and $\omega$, (E=g(T,$\omega$)), if the functions f(T,$\omega$) and g(T,$\omega$) as so selected that (1) $\delta$ is maintained above a predetermined safe limit; (2) the value of T is according to the present value of the torque in the motor drive, and (3) a predetermined criterion of operation for the motor drive is satisfied; then, the operative point for the motor drive will be on a definite curve (like the one shown in FIG. 11) and the criterion chosen will place such operative point on a preferred portion, for instance (FIG. 11) on the lower portion characterizing lower excitation losses, or on the higher portion characterizing higher power factor.

APPENDIX

This is a summary of mathematical expressions describing the operation of a 6-pulse thyristor converter in the inversion mode. This is the operating mode of the motor converter, assuming that the voltages V behind the sub-transient reactances are considered as the voltages of a three-phase source. They are assumed to be independent of the AC currents drawn from the source.

Referring to FIG. 1 the converter operating in the inversion mode is assumed to be fed from a current source delivering a fixed (though not necessarily constant) DC current $I_{dc}$. The thyristors are gated at firing delay angle $\alpha$. For convenience, however, its complementary angle $\beta=180°-\alpha$ will be used and called firing angle. This angle is measured from the 210° point of the line-to-neutral voltage pertaining to the thyristor to be fired. This reference point is also the 0 cross-over point of the line-to-line voltage pertaining to the thyristor to be commutated and the thyristor to be fired. Following gating at angle $\beta$, a commutation overlap of angular duration u follows. At the termination of the commutation overlap the thyristor just commutated becomes reverse biased for the angular duration $\delta$, where $\delta=\beta-u$. This commutation margin angle defines the time available to the thyristor for recovery.

Based on the above, the voltage across the DC terminals of the converter is:

$$V_{dc} = \frac{3\sqrt{6}}{\pi} V \cos\beta + \frac{3}{\pi} I_{dc} X'' \quad (A1.1)$$

where $X''=\omega L''$. $\omega$ is the angular frequency of the source into which the converter regenerates and $L''$ is the source inductance per phase. Using margin angle $\delta$ instead of firing angle $\beta$, the DC terminal voltage becomes:

$$V_{dc} = \frac{3\sqrt{6}}{\pi} V \cos\delta - \frac{3}{\pi} I_{dc} X'' \quad (A1.2)$$

By summing/subtracting the second equation to/from the first we get:

$$I_{dc} = \sqrt{6} \frac{V}{X''} \cdot \frac{\cos\delta - \cos\beta}{2} \quad (A1.3)$$

and $$V_{dc} = \frac{3\sqrt{6}}{\pi} \cdot V \frac{\cos\delta + \cos\beta}{2} \quad (A1.4)$$

which are expressions for the DC current and voltage, respectively, as functions of the firing and margin angles. These equations indicate that a given combination of $\beta$ and $\delta$ and a given source voltage V uniquely define the DC voltage and the DC current. Multiplication of the last two equations yields an expression for the DC power drawn by the converter:

$$P_{dc} = V_{dc}I_{dc} = \frac{9}{\pi} \cdot \frac{V^2}{X''} \cdot \frac{\cos^2\delta - \cos^2\beta}{2} \quad (A1.5)$$

If $\beta>60°$ in above equations, $\delta$ no longer represents the true margin angle. For $\beta>60°$, the true margin angle becomes $\delta'=\delta-(\beta-60°)$. The limit of validity of A1.5 is $\beta-\delta>60°$.

Since the DC power drawn by the converter must equal the AC power (ignoring losses) inverted and fed into the AC source:

$$P_{dc}=P_{ac}=3VI\cos\beta' \quad (A1.6)$$

where I is the rms value of the fundamental AC line currents and $\beta'$ is the displacement angle of I with respect to V. If there is no commutation overlap, $$\frac{I_{dc}}{I} = \frac{\pi}{\sqrt{6}} \quad (A1.7)$$

expresses the exact ratio between the DC input current and the rms of the fundamental AC output current. The inaccuracy is negligible even in the presence of commutation overlap and therefore this expression will be used for further computation. With this substitution and further rearrangement the displacement factor becomes:

$$\cos\beta' = \frac{\cos\delta + \cos\beta}{2} \quad (A1.8)$$

Equation (A1.8) defines the displacement angle.

This is a summary of mathematical expressions describing the combined operation of the synchronous motor and the converter commutated by the motor. The expressions are based on the equivalent circuit diagram of FIG. 2. It is assumed that the subtransient inductance $L''$ "sees" the entire line current $i_A$, $i_B$ and $i_C$ respectively, whereas the direct and quadrature axis synchronous inductances $L_d$ and $L_q$ "see" only the direct and quadrature axis components ($I_d$ and $I_q$ respectively) of the fundamental I of the three line currents. To preserve equivalence, this requires that the corresponding reactances ($=\omega$ times inductance) be adjusted as follows:

$$X_1=X_2-X'' \quad (A2.1)$$

$$sX_1=X_d-X'' \quad (A2.2)$$

$$X''=rX_1 \quad (A2.3)$$

As the vector diagram of FIG. 3 illustrates, the fundamental line current I leads the voltage V "behind the subtransient reactance" by displacement angle $\beta'$ which is the result of the inverter being gated at firing angle $\beta$, as discussed in the first part of the appendix. The direct and quadrature axis components of I cause voltage drops $sI_dX_1$ and $I_qX_1$ across three respective adjusted synchronous reactances which, when vectorially added to V, result in "induced voltage" or "excitation voltage" E. This fictitious voltage is a measure of the required pole excitation, assuming linear magnetic conditions (no saturation). In the presence of saturation the corresponding field current $I_f$ can be graphically determined. As described in detail in the reference, the meaning of U "voltage behind the synchronous reactance" is that it satisfies the power equation: $P_{ac}=3VI\cos\beta' = 3UI\cos\gamma$ where $\gamma$ is the torque angle of the machine. In other words, power is represented by U, while excitation requirement is represented by E. If the rotor is cylindrical, $s=1$ and $U=E$.

The first set of relationships uses torque angle $\gamma$ and normalized motor current IX/U as variables. Thus, the amplitude ratio of the voltage V behind the subtransient reactance and voltage U behind the synchronous reactance is:

$$\frac{V}{U} = \left[1 - 2\frac{IX_1}{U}\sin\gamma + \left(\frac{IX_1}{U}\right)^2\right]^{\frac{1}{2}} \quad (A2.4)$$

The cosines of firing angle $\beta$ and margin angle $\delta$ are defined by two symmetrical expressions, with the cosine of displacement angle $\beta'$ lying "in between":

$$\cos\beta = \frac{\cos\gamma - \frac{\pi}{6}r\frac{IX_1}{U}}{\left[1 - 2\frac{IX_1}{U}\sin\gamma + \left(\frac{IX_1}{U}\right)^2\right]^{\frac{1}{2}}} \quad (A2.5)$$

$$\cos\beta = \frac{\cos\gamma}{1 - 2\frac{IX_1}{U}\sin\gamma + \frac{IX_1}{U}^{2\frac{1}{2}}} \quad (A2.6)$$

$$\cos\delta = \frac{\cos\gamma + \frac{\pi}{6}r\frac{IX_1}{U}}{\left[1 - 2\frac{IX_1}{U}\sin\gamma + \left(\frac{IX_1}{U}\right)^2\right]^{\frac{1}{2}}} \quad (A2.7)$$

The equality of energy on DC and AC side and delivered on the motor shaft (ignoring losses) is stated by:

$$P_{dc}=V_{dc}I_{dc}=P_{ac}=3VI\cos\beta'=3UI\cos\gamma=P \quad (A2.8)$$

where the above introduced U "voltage behind the synchronous reactance" is defined by:

$$\frac{E}{U} = 1 + \frac{IX_1}{U}(s-1)\sin\gamma \quad (A2.9)$$

Power can be conveniently normalized to the machine's "short circuit power":

$$P^* = 3\frac{E^2}{X_d} \quad (A2.10)$$

and the normalized power is:

$$\frac{P}{P^*} = \frac{IX_1}{U} \cdot \frac{(s+r)\cos\gamma}{\left[1 + \frac{IX_1}{U}(s-1)\sin\gamma\right]^2} \quad (A2.11)$$

and $$\frac{P}{P^*} = \frac{IX_1}{U} \cdot \frac{V}{U} \cdot \frac{(s+r)\cos\beta'}{\left[1 + \frac{IX_1}{U}(s-1)\sin\gamma\right]^2} \quad (A2.12)$$

Looking at the last two equations, it should be remembered that margin angle $\delta$ is function of the same variables, which puts a practical limit to the available power with a more stringent restriction than if the motor was operated from a voltage source.

The effect of delivered power on the operation of the system is more readily seen if torque angle $\delta$ is eliminated as a variable and is replaced by power P, as follows:

In the following expressions the above defined short circuit power and the reactive power representing the energy stored in the adjusted synchronous reactance are normalized to the mechanical power and are introduced as new variables:

$$Z = \frac{3U^2/X_1}{P} \quad (A2.13)$$

$$Q = \frac{3I^2/X_1}{P} \quad (A2.14)$$

With these new variables:

$$\frac{IX_1}{U} = \sqrt{Q/Z} \quad (A2.15)$$

$$\cos\gamma = \frac{1}{\sqrt{Z\cdot Q}} \quad (A2.16)$$

and $$\cos\beta = \frac{1 - \frac{\pi}{6}rQ}{[ZQ - 2Q\sqrt{ZQ-1} + Q^2]^{\frac{1}{2}}} \quad (A2.17)$$

$$\cos\beta' = \frac{1}{[ZQ - 2Q\sqrt{ZQ-1} + Q^2]^{\frac{1}{2}}} \quad (A2.18)$$

$$\cos\delta = \frac{1 + \frac{\pi}{6}rQ}{[ZQ - 2Q\sqrt{ZQ-1} + Q^2]^{\frac{1}{2}}} \quad (A2.19)$$

$$\frac{V}{U} = \left[1 - \frac{2}{Z}\sqrt{ZQ-1} + \frac{Q}{Z}\right]^{\frac{1}{2}} \quad (A2.20)$$

$$\frac{E}{U} = 1 + \frac{s-1}{Z}\sqrt{ZQ-1} \quad (A2.21)$$

$$\frac{P}{P^*} + \frac{1}{Z} \cdot \frac{s+r}{\left[1 + \frac{s-1}{Z}\sqrt{ZQ-1}\right]^2} \quad (A2.22)$$

Equations A2.16 through 19 are of the general form:

$$\gamma = f_1(U,I,P)$$

$\beta = f_2(U,I,P)$ $\delta = f_3(U,I,P)$ $\beta' = f_4(U,I,P)$

Above equations indicate the degree of freedom in the system under steady state conditions. Since P is defined by the mechanical load on the motor at the given speed, it becomes an independent variable. For the other variables, the following alternatives exist:

(a) If $\beta$ firing angle is enforced on the system, U and I must be locked into a unique functional relationship $U = g_1(I)$. This relationship will also define $\delta$. Thus, $\delta = h_1(\beta, I, P)$.

(b) If $\delta$ margin angle is prescribed, again, U and I must be locked into a unique functional relationship $U = g_2(I)$. This relationship will also define where $\beta$ should fall. Thus, $\beta = h_2(\delta, I, P)$.

(c) If $\delta$ firing angle is enforced and $\delta$ margin angle is prescribed, only a unique (U,I) pair of values will make steady state operation possible for the given power P.

(d) If firing pulses to the inverter are simply delivered at a certain rate (which corresponds to the desired speed), but without regard to the rotor's or the terminal voltage's angular position, the rotor and the terminal voltage will assume angular positions $\delta$ and $\beta'$ respectively, as defined by the three variables V, I, P. Margin angle $\delta$ will also assume a value defined by these variables.

It is observed that alternative (a) above represents a control algorithm operating at constant $\beta$ firing angle and requiring a fixed $U = f_1(I)$ relationship, which is derived from the selected $I = f(P)$ relationship.

I claim:

1. In an adjustable speed synchronous motor drive operating with a torque T at an angular velocity $\omega$ including:
    an AC power supply; and AC/DC static line converter responsive to said power supply for establishing a DC voltage $V_{dc}$; a DC link for supplying a current $I_{dc}$ under said voltage $V_{dc}$; an inverter responsive to said DC link for supplying AC current I to said motor; means for controlling said line converter and said inverter under natural commutation, one by said AC power supply, the other by the EMF of said motor;
    and means for generating firing pulses onto said inverter at a rate which is proportional to the desired motor angular velocity $\omega^*$; the combination:
    first means operative in relation to said angular velocity $\omega$ for controlling $V_{dc}$ for establishing a first relationship between I and T;
    second means operative in relation to said current I for controlling $I_f$ for establishing a second relationship between $E/\omega$ and T, where $I_f$ is the field current of the motor and E is the motor excitation voltage; and
    said first and second relationships being such that for each value of the torque T and the angular velocity $\omega$, the commutation margin angle $\delta$ of the inverter, which is defined by a characteristic function $\delta = f_2(E,I,\omega,T)$, $\delta$ remains above a safe limit for the inverter.

2. The motor drive of claim 1, with the relationship between I and T and $E/\omega$ and T being selected to satisfy a predetermined criterion of operation for the motor drive.

3. The motor drive of claim 2, with said criterion being minimum excitation losses.

4. The motor drive of claim 2, with said criterion being a maximum power factor at the input of the motor drive.

5. The motor drive of claim 1, with said second means controlling said line converter to establish and maintain $(I)_{pu} = (T)_{pu}$, where $(I)_{pu}$ and $(T)_{pu}$ are the normalized values per-unit of the corresponding one of said current I and torque T.

6. The motor drive of claim 5 with said first means including a closed-loop field current regulator responsive to a reference signal representative of $A + (1-A)(I)_{pu}$ for keeping $(E/\omega)_{pu} = A + (1-A)(I)_{pu}$; where $(E/\omega)_{pu}$ is the normalized value per-unit of $E/\omega$ and A is a coefficient selected for minimizing motor excitation losses.

7. The motor drive of claim 6, with said inverter firing pulses generating means being responsive to said desired angular velocity $\omega^*$ reduced by $\Delta\omega$ in relation to the excess of $(I)_{pu}$ over $1_{pu}$.

8. The motor drive of claim 7 with $\Delta\omega$ being provided by a current limiter responsive to said excess of $(I)_{pu}$ over $1_{pu}$.

9. The motor drive of claim 2, with said first means including a closed-loop field regulator responsive to a reference signal representative of $A + (1-A)(I)_{pu}/\omega_1$ for keeping $(E/\omega)_{pu} = A + (1-A)(I)_{pu}/\omega_1$; where A is a selected coefficient chosen to keep $V_{dc}$ at $1_{pu}$ down to $\omega_1$ and to maximize $V_{dc}$ for angular velocities less than $\omega_1$, where $\omega_1$ is a selected angular velocity less than $1_{pu}$.

10. The motor drive of claim 9 with said inverter firing pulses generating means being responsive to said desired angular velocity $\omega^*$ reduced by $\Delta\omega$ in relation to the excess of $(I)_{pu}$ over the larger of said $\omega$ and $\omega_1$ values.

11. The motor drive of claim 11 with said second means being responsive to a desired voltage $V_{dc}$ for controlling said line converter to establish $V_{dc}$ in said DC link, and with $V_{dc}$ being reduced by $\Delta V_{dc}$ in relation to the excess of $(I)_{pu}$ over the larger one of said $\omega$ and $\omega_1$ values.

12. The motor drive of claim 12 with $\Delta V_{dc}$ and $\Delta\omega^*$ being provided by a current limiter responsive to said excess of $(I)_{pu}$.

13. In an adjustable speed synchronous motor drive operating with an excitation voltage E, a torque T at an angular velocity $\omega$ including:
    an AC power supply; an AC/DC static line converter responsive to said power supply for establishing a DC voltage $V_{dc}$; a DC link for supplying a current $I_{dc}$ under said voltage $V_{dc}$; an inverter responsive to said DC link for supplying AC current I to said motor; means for controlling said line converter and said inverter under natural commutation, one by said AC power supply, the other by the EMF of said motor;
    and means for generating firing pulses onto said inverter at a rate which is proportional to the desired motor angular velocity $\omega^*$, the combination:
    means responsive to $V_{dc}$, I and $\omega$ for providing an indication of a torque value T;
    means for controlling I as a predetermined function $f(T,\omega)$;
    means for controlling E as a predetermined function $g(T,\omega)$;
    said function $f(T,\omega)$ and $g(T,\omega)$ being selected so that (1) the commutation margin angle $\delta$ remains above a predetermined safe limit; (2) the value of the torque T is according to said torque value; and (3) a predetermined criterion of operation for the motor drive is satisfied.

* * * * *

UNITED STATES PATENT AND TRADEMARK OFFICE
CERTIFICATE OF CORRECTION

PATENT NO. : 4,460,861

DATED : July 17, 1984

INVENTOR(S) : John Rosa

It is certified that error appears in the above—identified patent and that said Letters Patent is hereby corrected as shown below:

In the face sheet, item [22], cancel "Jan. 21, 1983" and insert -- Oct. 21, 1983 --.

Signed and Sealed this

Twelfth Day of March 1985

[SEAL]

Attest:

DONALD J. QUIGG

Attesting Officer     Acting Commissioner of Patents and Trademarks